Jan. 31, 1956
J. R. OISHEI
2,732,685
VEHICLE BRAKE AND ACCESSORY SYSTEM
Filed April 8, 1954
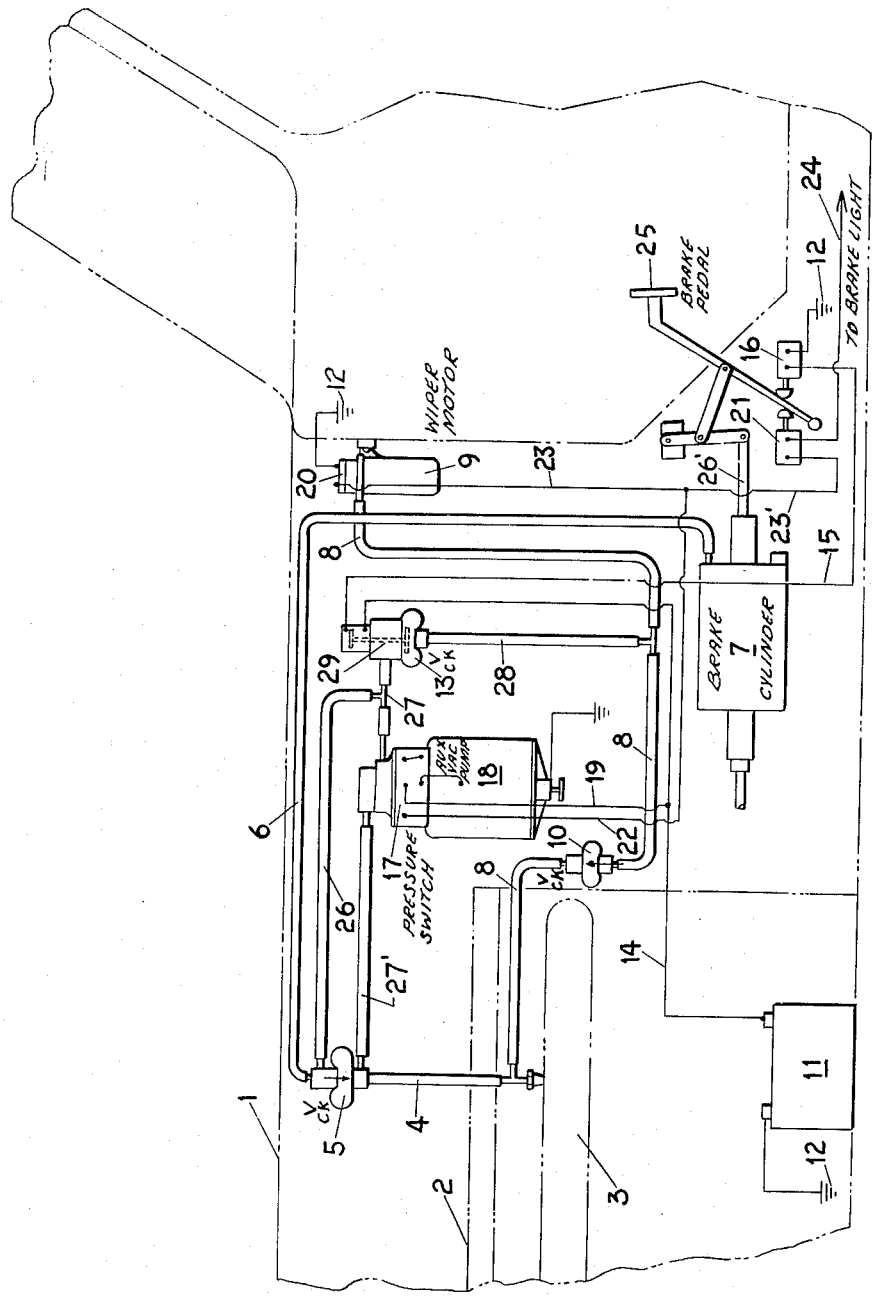
INVENTOR.
John R. Oishei
BY
Bean, Brooks, Buckley & Bean
attys.

2,732,685
Patented Jan. 31, 1956

United States Patent Office

2,732,685
VEHICLE BRAKE AND ACCESSORY SYSTEM

John R. Oishei, Buffalo, N. Y., assignor to Trico Products Corporation, Buffalo, N. Y.

Application April 8, 1954, Serial No. 421,747

10 Claims. (Cl. 60—60)

This invention relates to an accessory system for automotive vehicles, and more particularly to the braking system therefor.

The suction influence of the power plant has heretofore been utilized to activate the braking system and other accessories of the vehicle. However, due to the fluctuating characteristic of such suction, it has been found to be impossible to continuously maintain a vacuum of sufficient magnitude for the operation of the accessories. Resort has therefore been had to an auxiliary pump to supplement the power plant created vacuum when the latter falls below a predetermined level. However, pumps of a size practicable for installation in automotive vehicles do not have the capacity sufficient for the simultaneous operation of the brake and one or more of the other fluid operated accessories, such as the windshield cleaner. As a result, brake failure during inclement weather when the windshield cleaner is in operation, may become a common occurrence in those vehicles equipped with pneumatically powered brakes.

Accordingly, it is an object of the present invention to provide a system wherein a vacuum of sufficient magnitude for efficient brake operation will be available under all circumstances.

An additional object of the invention is to provide a system giving the pneumatically powered brake preference over other accessories of the vehicle to the use of the available suction.

For a better understanding of these and other objects of the invention, reference is made to the following specifications and accompanying drawing, wherein an automotive vehicle having a pneumatically powered accessory system constructed in accordance with the present invention, is diagrammatically shown in the sole figure.

Referring now more particularly to the drawing, the numeral 1 designates an automotive vehicle, and 2 the engine, with 3 being the intake manifold thereof. Conduit 4 leads from the manifold to the outlet side of check valve 5, while conduit 6 interconnects the intake side of the check valve and pneumatic cylinder 7. Conduit 8 interconnects the manifold and wiper motor 9 with check valve 10 interposed therebetween.

One terminal of battery 11 is grounded at 12, while the other terminal is connected to the solenoid controlled check valve 13, by lead 14. Lead 15 connects the opposite side of the solenoid to brake pedal operated switch 16, which is grounded at 12 completing the circuit back to the battery. The pressure sensitive switch 17 of auxiliary pump 18 is placed in parallel with the solenoid controlled check valve 13 and switch 16, by lead 19, while wiper controlled switch 20 and booster switch 21 are placed in parallel with each other and compositely in series with the pressure sensitive switch by leads 22, 23 and 23'. The wiper controlled switch is grounded at 12, while lead 24 interconnects booster switch 21 and the brake light, not shown, in the conventional manner. The opposite side of the brake light is grounded as is customary so as to complete the circuit back to the battery.

If the vehicle is in operation with sufficient vacuum present in the intake manifold for efficient operation of the accessories, check valves 5 and 10 will be forced open by the pressure differential thereacross. In the event that the operator desires to decelerate the vehicle, he depresses pedal 25. Depression of the pedal causes plunger 26' to open the valve, not shown, of the pneumatic cylinder 7, placing the latter in communication with the manifold via conduit 6, check valve 5 and conduit 4, resulting in a withdrawal of air from the cylinder by the manifold and activation of the brake, not shown. Depression of the brake pedal also closes booster switch 21, completing the brake light circuit. If the circumstances are such that the magnitude of the vacuum existent in the manifold is insufficient for brake operation, check valve 5 will close, as will the pressure sensitive switch 17 in the auxiliary pump 18. Under these conditions depression of pedal 25 and the closing of switch 21 resulting therefrom, will complete the circuit to the auxiliary pump, and the latter will commence operation. The air will pass from cylinder 7 into the intake side of the pump via conduits 6, 26 and 27. The pump exhaust passes into the manifold via conduits 27' and 4. For a more complete disclosure of the operation of the pneumatically powered brake, reference may be had to application Serial No. 369,015, filed by John R. Oishei on July 20, 1953, for a Power Brake System.

The mode of operation of any of the other pneumatically powered accessories installed in the vehicle is substantially similar to that disclosed above. By way of example, the windshield cleaner is illustrated herein, but it should be clear that the same principles apply when one or more other accessories are being utilized, either individually or simultaneously with the windshield cleaner.

If the operator desires to clear the windshield, he starts motor 9 in the conventional manner. As the motor valve is moved to the "on" position, it intercommunicates the manifold and motor, and also closes switch 20. If the magnitude of the manifold suction is above a predetermined minimum, check valve 10 will be open and air is withdrawn from the motor by the manifold via conduit 8. The motor will therefore be set in operation so as to drive the wipers, not shown, through the customary linkage. In the event that the manifold suction is low, check valve 10 and the pressure sensitive switch in the pump will both be closed. Closure of switch 20 as the valve of motor 9 is moved to the "on" position, will then complete the circuit to the pump setting the latter in operation. Air will then be withdrawn from the motor by the pump via conduits 8 and 28, solenoid controlled check valve 13, which is normally open, and conduit 27. The pump will exhaust to the manifold as disclosed above.

In the event that it is desired to utilize the brake while the cleaner is in operation, both accessories will work simultaneously if the manifold vacuum is of a sufficient magnitude. Air will be evacuated from cylinder 7 via conduits 6 and 4 concurrently with the withdrawal of air from motor 9 via conduit 8. However, if auxiliary pump 18 is in operation there is insufficient capacity available for the operation of the brake as well as the cleaner. To avoid brake failure, due to a low vacuum, normally open solenoid controlled check valve 13 is utilized. When brake pedal 25 is depressed, normally open switch 16 is closed. This completes the circuit to the solenoid, causing its armature 29 to move downward, closing the valve so as to seal conduit 28, and cut off the flow of air from the cleaner motor 9 to the pump. As a result, the entire pump capacity is made available for brake operation.

Upon release of the brake pedal, switch 16 opens, breaking the circuit to the solenoid and causing the armature to move back to the position illustrated. Air is thus again permitted to flow from the motor to the pump.

It may therefore be seen that by employing the present invention, a vacuum of sufficient magnitude for efficient operation is always available to the brake, regardless of the manifold condition, or whether any other accessory is being employed at the time it is desired to decelerate the vehicle.

Having thus disclosed an exemplary embodiment thereof, what I claim as my invention is:

1. In combination with an automotive vehicle having a power plant with a primary source of suction and a pneumatically powered accessory, a pneumatically powered brake connected to the primary source of suction, an auxiliary source of suction interposed between said brake and primary source, said auxiliary source of suction being operative when the vacuum created by said primary source drops below a predetermined magnitude, a conduit interconnecting said pneumatically powered accessory and said auxiliary source, a normally open valve in said conduit between said accessory and auxiliary source, and means to simultaneously close said valve and actuate said pneumatically powered brake.

2. In combination with an automotive vehicle having a pneumatically powered accessory, a source of suction, a pneumatically powered brake having a pneumatic cylinder connected to the source of suction, said brake being activated by the withdrawal of air from the cylinder by the source of suction, manually operable means to control the withdrawal of air from the cylinder, a conduit connecting the source of suction to the accessory, a normally open valve in said conduit between said accessory and source of suction, and means to close said valve concurrently with the operation of said manually operable means.

3. In combination with an automotive vehicle having a power plant with a primary source of suction and a pneumatically powered accessory, a pneumatically powered brake having a pneumatic cylinder connected to the primary source of suction, said brake being activated by the withdrawal of air from the cylinder, an auxiliary source of suction interposed between the primary source and the brake, said auxiliary source being operative when the vacuum created by the primary source drops below a predetermined magnitude, manually operable means to control the withdrawal of air from the cylinder, a conduit interconnecting the pneumatically powered accessory and the auxiliary source of suction, a normally open valve in said conduit between the secondary source and the accessory, and means to close said valve concurrently with the operation of said manually operable means.

4. In combination with an automotive vehicle having a pneumatically powered accessory, a source of suction, a pneumatically powered brake having a pneumatic cylinder connected to the source of suction, said brake being activated by the withdrawal of air from the cylinder by the source of suction, manually operable means the actuation of which permits the withdrawal of air from the cylinder, a conduit connecting the source of suction to the accessory, a normally open solenoid controlled valve in said conduit between the accessory and source of suction, and an electric switch connected in series with the solenoid controlled valve, said switch being permitted to close by the actuation of the manually operable means so as to activate and close the valve.

5. In combination with an automotive vehicle having a power plant with a primary source of suction and a pneumatically powered accessory, a pneumatically powered brake having a pneumatic cylinder connected to the primary source of suction, said brake being activated by the withdrawal of air from the cylinder, an auxiliary source of suction interposed between the primary source and the brake, said auxiliary source being operative when the vacuum created by the primary source drops below a predetermined magnitude, manually operable means the actuation of which permits the withdrawal of air from the cylinder, a conduit interconnecting the source of suction and the accessory, a normally open solenoid controlled valve in said conduit between the accessory and the source of suction, and an electric switch connected in series with the solenoid controlled valve, said switch being permitted to close by the actuation of the manually operable means so as to activate and close the valve.

6. In combination with an automotive vehicle having a power plant with a primary source of suction and a pneumatically powered accessory, a pneumatically powered brake connected to the primary source of suction, an auxiliary source of suction interposed between said cylinder and primary source, said auxiliary source of suction being operative when the vacuum created by said primary source drops below a predetermined magnitude, a conduit interconnecting said pneumatically powered accessory and said primary source, a branch conduit providing a secondary path between the accessory and primary source, said auxiliary source of suction being interposed between said accessory and primary source in said branch conduit, a normally open valve in said branch conduit between the accessory and secondary source, and means to simultaneously close said valve and actuate said pneumatically powered brake, closure of said valve effectively stopping the withdrawal of air from the accessory by the auxiliary source of suction when the latter is operative.

7. In combination with an automotive vehicle having a power plant with a primary source of suction and a pneumatically powered accessory, a brake having a pneumatic cylinder connected to the primary source of suction, said brake being activated by the withdrawal of air from the cylinder, manually operable means to control the withdrawal of air from the cylinder, an electrically driven auxiliary source of suction interposed between the primary source and the brake, a first switch connected to the auxiliary source, said first switch being closed by the commencement of operation of the accessory, a second switch connected to the auxiliary source in parallel with said first switch, said second switch being closed by the operation of said manually operable means, said auxiliary source being operative upon the closure of the first or second switches and the concurrent dropping of the vacuum created by the primary source below a predetermined magnitude, a conduit interconnecting the auxiliary source and the accessory, and a valve in the conduit between the auxiliary source and the accessory, said valve closing upon the operation of said manually operable means.

8. In combination with an automotive vehicle having a pneumatically powered accessory, an electrically driven source of suction, a brake having a pneumatic cylinder connected to the source of suction, said brake being activated by the withdrawal of air from the cylinder by the source of suction, manually operable means to control the withdrawal of air from the cylinder, a first switch connected to the source of suction, said first switch being closed by the commencement of operation of the accessory, a second switch connected to the source of suction in parallel with said first switch, said second switch being closed by the operation of said manually operable means, said source of suction being operative when either or both of said first or second switches are closed, a conduit interconnecting the source of suction and the accessory, and a valve in said conduit between the source and the accessory, said valve closing upon the operation of said manually operable means.

9. In combination with an automotive vehicle having a power plant with a primary source of suction and a pneumatically powered accessory, a brake having a pneumatic cylinder connected to the primary source of suction, said brake being activated by the withdrawal of air from the cylinder, manually operable means to control the withdrawal of air from the cylinder, an electrically driven auxiliary source of suction interposed between the primary source and brake, a first switch connected to the auxiliary source, said first switch being closed by the commencement of operation of the accessory, a second switch connected to the auxiliary source in parallel with said first switch, said second switch being closed by the operation of said manually operable means, said auxiliary source being operative upon the closure of the first or second switches and the concurrent dropping of the vacuum created by the primary source below a predetermined magnitude, a conduit interconnecting the auxiliary source and the accessory, a normally open solenoid controlled valve in said conduit between the accessory and secondary source, and an electric switch connected to the solenoid controlled valve, said switch being permitted to close by actuation of the manually operable means so as to activate and close the valve.

10. In combination with an automotive vehicle having a pneumatically powered accessory, an electrically driven source of suction, a brake having a pneumatic cylinder connected to the source of suction, said brake being activated by the withdrawal of air from the cylinder by the source of suction, manually operable means the actuation of which permits the withdrawal of air from the cylinder, a first switch connected to the source of suction, said first switch being closed by the commencement of operation of the accessory, a second switch connected to the source of suction in parallel with said first switch, said second switch being closed by the operation of said manually operable means, said source of suction being operative when either or both of said first or second switches are closed, a conduit interconnecting the source of suction and the accessory, a normally open solenoid controlled valve in said conduit between the accessory and source of suction, and an electric switch connected to the solenoid controlled valve, said switch being permitted to close by the actuation of the manually operable means so as to activate and close the valve.

References Cited in the file of this patent
UNITED STATES PATENTS
2,059,457   Horton _____ Nov. 3, 1936